United States Patent
Hsu et al.

(10) Patent No.: US 9,772,653 B2
(45) Date of Patent: Sep. 26, 2017

(54) MECHANISM FOR CHARGING PORTABLE DEVICE WITH USB DOCK

(71) Applicant: VIA TECHNOLOGIES, INC., New Taipei (TW)

(72) Inventors: Chin-Sung Hsu, New Taipei (TW); Terrance Shiyang Shih, Milpitas, CA (US); Li-Feng Pan, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 218 days.

(21) Appl. No.: 14/692,155

(22) Filed: Apr. 21, 2015

(65) Prior Publication Data

US 2015/0338881 A1 Nov. 26, 2015

Related U.S. Application Data

(60) Provisional application No. 62/001,811, filed on May 22, 2014.

(51) Int. Cl.
| | |
|---|---|
| *G06F 13/40* | (2006.01) |
| *G06F 1/16* | (2006.01) |
| *G06F 1/26* | (2006.01) |
| *G06F 1/00* | (2006.01) |

(52) U.S. Cl.
CPC ............ *G06F 1/1632* (2013.01); *G06F 1/266* (2013.01); *G06F 13/4081* (2013.01)

(58) Field of Classification Search
None
See application file for complete search history.

(56) References Cited

U.S. PATENT DOCUMENTS

| | | |
|---|---|---|
| 6,668,296 B1 | 12/2003 | Dougherty et al. |
| 8,364,649 B2 | 1/2013 | Holbein et al. |
| 2008/0186410 A1 | 8/2008 | Hardacker et al. |
| 2008/0265838 A1 | 10/2008 | Garg et al. |
| 2010/0169534 A1* | 7/2010 | Saarinen ............... G06F 13/385 710/316 |
| 2013/0151749 A1* | 6/2013 | Lai ...................... G06F 13/4068 710/313 |
| 2013/0300343 A1* | 11/2013 | Files .................... H02J 7/0055 320/103 |
| 2013/0301301 A1 | 11/2013 | Fischer |

OTHER PUBLICATIONS

Chinese language Notice of Allowance dated Jun. 30, 2016, issued in application No. TW 104116187.

\* cited by examiner

*Primary Examiner* — Scott Sun
(74) *Attorney, Agent, or Firm* — McClure, Qualey & Rodack, LLP

(57) ABSTRACT

A Universal Serial Bus (USB) dock is provided. The USB dock includes: a plurality of downstream ports; and a upstream port, connecting the USB dock to a portable device, wherein the upstream port includes an On-the-go (OTG) ID pin and a differential pair; and a microcontroller, configured to detect operating states of the portable device, wherein when it is detected that the portable device is in a USB OTG host mode and has entered a suspend state, the microcontroller controls the portable device to switch from the USB OTG host mode to a USB device mode by toggling a state of the USB OTG ID pin, thereby charging the portable device via the upstream port.

18 Claims, 1 Drawing Sheet

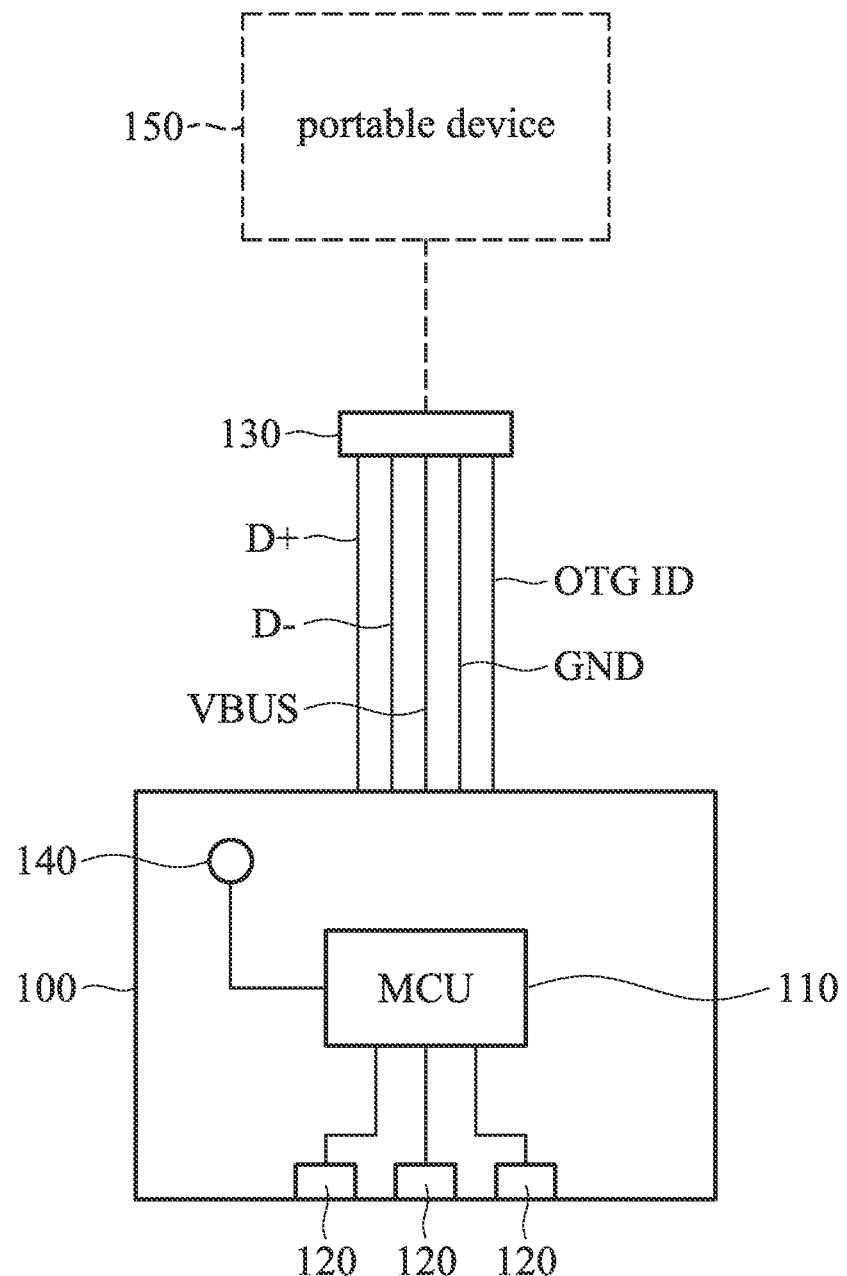

MECHANISM FOR CHARGING PORTABLE DEVICE WITH USB DOCK

CROSS REFERENCE TO RELATED APPLICATIONS

This application claims the benefit of U.S. Provisional Application No. 62/001,811, filed May 22, 2014, the entirety of which is incorporated by reference herein.

BACKGROUND OF THE INVENTION

Field of the Invention

The present invention relates to a dock for portable devices, and, in particular, to a Universal Serial Bus (USB) dock capable of charging a portable device in response to the detected operating state of the portable device.

Description of the Related Art

The demand for new features and the ability to easily connect peripheral devices to computer systems has led to several new developments in computer systems in recent years. One such development is the Universal Serial Bus (USB). The USB specification was developed in order to provide an external expansion bus which allowed peripheral devices to be added with the same ease as connecting a telephone to a wall jack. Since its introduction, USB has enjoyed widespread acceptance in the marketplace.

USB On-the-go (OTG) defines two roles of devices: OTG A-device and OTG B-device. This terminology defines which side supplies power to the link, and which is initially the host. The OTG A-device is a power supplier, and an OTG B-device is a power consumer. The default link configuration is that the A-device acts as USB Host and the B-device is a USB peripheral. USB On-The-Go introduces the concept that a device can perform both the master and slave roles, and so subtly changes the terminology. With OTG, a device can be either a host when acting as the link master, or a peripheral when acting as the link slave. The choice of whether to be host or peripheral is handled entirely by which end of the cable the device is plugged into. The device connected to the "A" end of the cable at start-up, known as the "A-device", acts as the default host, while the "B" end acts as the default peripheral, known as the "B-device".

In the USB battery charging specification, USB devices always draw power from USB hosts. If the user wants to use his portable device as a USB host, a specific type of cable having an ID pin is usually used. In this regard, a USB micro A/B cable having an OTG ID pin is usually used. When a USB device is connected to a portable device via the USB micro A/B cable, the portable device will switch from the USB device mode to a USB OTG host mode, and the portable device may provide power to the connected USB device.

In a docking scenario, the user may be stationary for a long period of time, and generally requires the use of a large-screen and traditional input devices such as a keyboard or a mouse. USB docks can provide the required video and USB input/storage functionality while the portable device is in the USB OTG host mode. However, the portable device is utilizing its own power while in the USB OTG host mode. Even if the USB dock has its own power source, the power of the USB dock cannot be shared with the portable device because the function is not defined in the USB battery charging specification.

BRIEF SUMMARY OF THE INVENTION

A detailed description is given in the following embodiments with reference to the accompanying drawings.

In an exemplary embodiment, a Universal Serial Bus (USB) dock is provided. The USB dock includes: a plurality of downstream ports; and a upstream port, connecting the USB dock to a portable device, wherein the upstream port includes an On-the-go (OTG) ID pin and a differential pair; and a microcontroller, configured to detect operating states of the portable device, wherein when it is detected that the portable device is in a USB OTG host mode and has entered a suspend state, the microcontroller controls the portable device to switch from the USB OTG host mode to a USB device mode by toggling a state of the USB OTG ID pin, thereby charging the portable device via the upstream port.

In another exemplary embodiment, a method for charging a portable device with a USB dock is provided. The USB dock includes a plurality of downstream ports and an upstream port. The method includes the steps of: connecting the USB dock to the portable device via the upstream port, wherein the upstream port includes an On-the-go (OTG) ID pin and a differential pair; detecting operating states of the portable device; and controlling the portable device to switch from the USB OTG host mode to a USB device mode by toggling a state of the USB OTG ID pin to charge the portable device via the upstream port when it is detected that the portable device is in the USB OTG host mode and has entered a suspend state.

BRIEF DESCRIPTION OF THE DRAWINGS

The present invention can be more fully understood by reading the subsequent detailed description and examples with references made to the accompanying drawings, wherein:

FIG. 1 is a diagram of a USB dock in accordance with an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIG. 1 is a diagram of a USB dock in accordance with an embodiment of the invention. In an embodiment, the USB dock 100 includes a microcontroller (MCU) 110, a plurality of downstream ports 120, and an upstream port 130. The upstream port 130 is capable of coupling the USB dock 100 to a portable device 150, such as a mobile phone, or a tablet PC. The downstream ports 120 are capable of coupling the USB dock 100 to other USB devices, such as a monitor, a keyboard, or a mouse that help to input or output information of the portable device being connected to the USB dock 100. In an embodiment, the upstream port 130 is a USB micro A/B connector including a differential pair (D+ and D−), a VBUS power pin, a ground (GND) pin, and an OTG ID pin. The microcontroller 110 may detect the operating state of the portable device 150 according to the state of the OTG ID pin. For example, the microcontroller may know that the portable device 150 is in a working state (such as a USB OTG host mode) when the state of the OTG ID pin is in a first state (e.g. grounded). In another embodiment, the upstream port 130 is compatible with the USB micro A/B interface which includes a differential pair (D+ and D−), a VBUS power pin, a ground (GND) pin, and an OTG ID pin. Specifically, there are various types of USB connectors on the market, but all of them are equipped with the primary USB pins as described above.

In a scenario in which when the user attaches the portable device 150 to the USB dock 100, the USB dock 100 may enable the USB OTG host mode on the portable device 150 to enable use of the USB accessories connected to downstream ports 120 of the USB dock 100, and perform normal data transmission between the portable device 150 and USB accessories. It should be noted that the portable device 150 cannot be charged via the upstream port 130 in the USB OTG host mode since the portable device 150 acts as a "host" in the USB OTG host mode.

When the portable device 150 issues a suspend command via the differential pair to the USB dock 100, the microcontroller in the USB dock 100 may set the state of the OTG ID pin to a second state (e.g. floating) to force the portable device 150 to enter a USB device mode from the USB OTG host mode, such that the USB dock 100 may charge the portable device 150 via the upstream port 130. It should be noted that the portable device 150 may automatically enter a suspend state when the portable device 150 has been idle for a predetermined time period. Alternatively, the portable device 150 may also enter the suspend state when the user manually turns off the power to the screen, but the invention is not limited thereto. Upon entering the suspend state, the portable device 150 may issue a suspend command to the USB dock 100.

Specifically, when the USB dock 100 receives the suspend command from the portable device 150, the USB dock 100 may disconnect the differential pairs and then short the differential pairs, such that the portable device 150 may detect as if the upstream port 130 has been physically disconnected and re-plugged into the portable device 150. Then, the USB dock 100 may set the state of the OTG ID pin to a second state to force the portable device 150 to enter the USB device mode from the USB OTG host mode. It should be noted that the USB dock 100 may provide various rapid-charging modes to charge the portable device 150 by setting the voltage of the differential pair when the portable device 150 is in the USB device mode. For example, the rapid-charging modes may be a power delivery mode defined in the USB battery charging specification v1.2, an Apple mode, or another rapid-charging mode, but the invention is not limited thereto.

In an embodiment, the USB dock 100 further includes a button 140 which is a physical button and is configured to switch the USB operation mode of the portable device 150 via a GPIO interface. For example, when the user demands to switch the portable device 150 back to the USB OTG host mode from the USB device mode, the user may push the button 140. Then, the microcontroller 110 detects the button is pushed and notifies the portable device 150 to enter the USB OTG host mode from the USB device mode by setting the state of the OTG ID pin to the first state (e.g. grounded) via the GPIO interface.

In an alternative embodiment, when the user demands to switch the portable device 150 back to the host mode from the USB device mode, the user may send a trigger signal by utilizing one of the peripheral devices connected to the USB dock 100, such that the USB dock 100 may disconnect the differential pair to exit the USB device mode. Then, the USB dock may activate the differential pair and set the state of the OTG ID pin to the first state to notify the portable device 150 to enter the USB OTG host mode.

In another alternative embodiment, instead of waiting for the portable device 150 to enter the suspend state, the USB dock 100 may actively force the portable device 150 to enter the suspend state from the working state by send a specific suspend command from a virtual endpoint which is predefined in the USB dock 100. The specific suspend command may be triggered by the user pushing another button (not shown in FIG. 1). In one embodiment, the virtual endpoint is belonged to a virtual connected device which is coupled to a virtual port of the USB dock 100. For example, the virtual endpoint is configured to emulate a keyboard and it is capable to send the suspend command to the portable device 150. That is, this virtual endpoint is a pre-defined endpoint in the USB dock 100 for suspending the portable device 150. In this way, it is no need to wait for the portable device automatically suspends. In other word, it also provides the flexibility for the user when user needs to charge the portable device anytime.

In another embodiment, the specific suspend command may be triggered by the same button 140 which is mentioned previously. In this condition, the button 140 has multiple functions depend on the state of the portable device 150. When the portable device 150 is in the OTG host mode, the portable device is enter the suspend state when pushing the button 140. When the portable device 150 is in the USB device mode, the portable device is toggled to switch from the USB device mode to the USB OTG host mode when pushing the same button 140.

In view of the above, the USB dock 100 is capable of detecting the working state of the portable device 150 while the USB OTG host mode is enabled. The USB dock 100 is also capable of controlling the portable device 150 to switch from the USB OTG host mode to the USB charging mode by toggling the state of the USB OTG ID pin. In addition, the USB dock 100 is further capable of charging the portable device 150 from the upstream port 130. The above-mentioned feature of the USB dock 100 is nontrivial since the feature is not defined in the USB specification. The present invention has specialized hardware and firmware functions that enable the above-mentioned features, allowing the portable device 150 to be rapidly charged when the user no longer needs to use the USB accessories and while the portable device 150 is still attached to the USB dock 100.

While the invention has been described by way of example and in terms of the disclosed embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Universal Serial Bus (USB) dock, comprising:
   a plurality of downstream ports; and
   a upstream port, for connecting the USB dock to a portable device, wherein the upstream port comprises an On-the-go (OTG) ID pin and a differential pair; and
   a microcontroller, configured to detect operating states of the portable device,
   wherein when it is detected that the portable device is in a USB OTG host mode and has entered a suspend state, the microcontroller controls the portable device to switch from the USB OTG host mode to a USB device mode by toggling a state of the USB OTG ID pin, thereby charging the portable device via the upstream port.

2. The USB dock as claimed in claim 1, wherein the upstream port is implemented by the USB micro A/B interface.

3. The USB dock as claimed in claim 1, wherein the upstream port is compatible with the USB micro A/B interface.

4. The USB dock as claimed in claim 1, further comprising: a first button for toggling the portable device to switch from the USB device mode to the USB OTG host mode.

5. The USB dock as claimed in claim 1, further comprising: a second button for controlling the portable device to enter the suspend state when the portable device is in the OTG host mode.

6. The USB dock as claimed in claim 1, wherein when the portable device is in the USB OTG host mode, the microcontroller performs data transmission between the portable device and USB accessories connected to the downstream ports of the USB dock.

7. The USB dock as claimed in claim 1, wherein the portable device issues a suspend command to the microcontroller when the portable device has entered the suspend state, and the microcontroller disconnects the differential pair and then re-activates the differential pair when the microcontroller has received the suspend command, such that the portable device enters the USB device mode from the USB OTG host mode.

8. The USB dock as claimed in claim 1, wherein the microcontroller further shorts the differential pair to enable a rapid-charging mode when the portable device has entered the USB device mode.

9. The USB dock as claimed in claim 6, wherein when a user sends a trigger signal by utilizing one of the USB accessories connected to the USB dock, the USB dock controls the portable device to enter the USB OTG host mode from the USB device mode in response to the trigger signal.

10. A method for charging a portable device with a USB dock, wherein the USB dock comprises a plurality of downstream ports and an upstream port, the method comprising:
    connecting the USB dock to the portable device via the upstream port, wherein the upstream port comprises an On-the-go (OTG) ID pin and a differential pair;
    detecting operating states of the portable device; and
    controlling the portable device to switch from the USB OTG host mode to a USB device mode by toggling a state of the USB OTG ID pin to charge the portable device via the upstream port when it is detected that the portable device is in the USB OTG host mode and has entered a suspend state.

11. The method as claimed in claim 10, wherein the upstream port is implemented by the USB micro A/B interface.

12. The method as claimed in claim 10, wherein the upstream port is compatible with the USB micro A/B interface.

13. The method as claimed in claim 10, wherein the USB dock further comprises a first button, and the method further comprises:
    toggling the portable device to switch from the USB device mode to the USB OTG host mode by pushing the first button.

14. The method as claimed in claim 10, wherein the USB dock further comprises a second button, and the method further comprises:
    controlling the portable device to enter the suspend state when the portable device is in the OTG host mode by pushing the second button.

15. The method as claimed in claim 10, further comprising:
    performing data transmission between the portable device and USB accessories connected to the downstream ports of the USB dock when the portable device is in the USB OTG host mode.

16. The method as claimed in claim 10, further comprising:
    issuing a suspend command to a microcontroller by the portable device when the portable device has entered the suspend state; and
    disconnecting the differential pair and then re-activating the differential pair by the microcontroller when the microcontroller has received the suspend command, such that the portable device enters the USB device mode from the USB OTG host mode.

17. The method as claimed in claim 10, further comprising: shorting the differential pair to enable a rapid-charging mode when the portable device has entered the USB device mode.

18. The method as claimed in claim 15, further comprising:
    when a user sends a trigger signal by utilizing one of the USB accessories connected to the USB dock, controlling the USB dock to control the portable device to enter the USB OTG host mode from the USB device mode in response to the trigger signal.

* * * * *